UNITED STATES PATENT OFFICE.

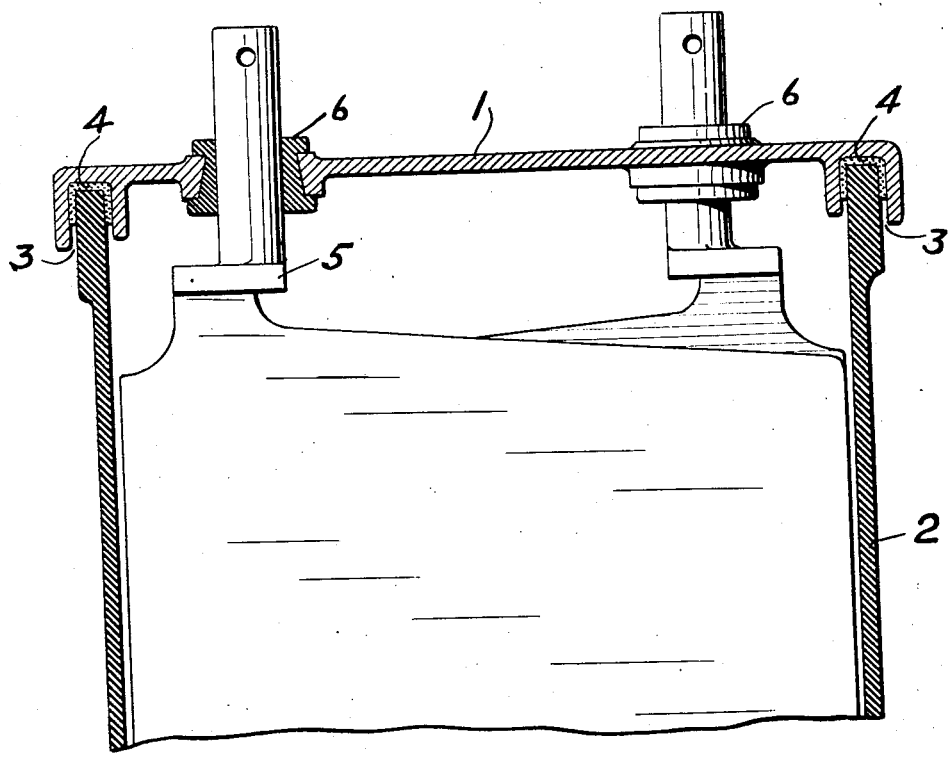

JOSEPH LESTER WOODBRIDGE, OF PHILADELPHIA, PENNSYLVANIA.

STORAGE-BATTERY CONTAINER.

1,364,469.  Specification of Letters Patent.  Patented Jan. 4, 1921.

Application filed February 13, 1919. Serial No. 276,739.

*To all whom it may concern:*

Be it known that I, JOSEPH LESTER WOODBRIDGE, a citizen of the United States, residing at Philadelphia, in the county of Philadelphia and State of Pennsylvania, have invented certain new and useful Improvements in Storage-Battery Containers, of which the following is a specification.

The principal object of the present invention is to provide a battery container in which the cover can be satisfactorily sealed and unsealed in respect to the jar and which possesses the advantages of a hard rubber, or hard rubber material, jar and a leaden or lead alloy cover.

The invention will be claimed at the end hereof but will be first described in connection with the accompanying drawings forming part hereof and in which there is illustrated principally in section a portion of a battery container embodying features of the invention.

In the drawings 1, is a cover of alloy of lead or leaden material fusible at a higher temperature than that at which sealing compound softens and at a higher temperature than hard rubber can withstand without injury. 2, is a hard rubber, or hard rubber material, jar adapted to a groove 3, in the inner face of the cover. 4, is sealing compound arranged in the groove 3, and adapted to be softened by the application of heat to the outer face of the cover in inverted position. The container possesses the advantages of a hard rubber jar among which reference may be made to its property of withstanding the action of acid and resisting the effect of electrolytic action, and the container possesses the advantages of a leaden cover among which reference may be made to mechanical strength at a place where strength is desirable for supporting the top portions of the hard rubber jar which often is somewhat softened by heat due to the operation of the battery, and at a place remote from acid and electrolytic action. The container possesses other and unexpected advantages and results that have to do with sealing the jar and cover. The leaden or lead alloy cover will stand a higher heat than hard rubber or hard rubber material and serves as a means for heating and softening sealing compound arranged in its groove 3, so that heat may be applied to the cover without hurting it in order to soften the sealing compound sufficiently for application to the jar wall for making a good joint when the cover is applied to the jar. This is a matter of great practical benefit and advantage as will be readily understood by those skilled in the art. Again the material of the cover is strong enough to permit the cover to be pulled off without injury, and the provision of a cover that can be readily applied and sealed and also pulled off is a matter of importance in the art. Furthermore, the material of the cover is a good conductor of heat, which is a decided advantage both in facilitating the dissipation of heat developed in the cell during charge and also in permitting a comparatively low degree of heat to be applied in case it is desired to apply heat to soften the compound for removing the cover. A good sealing compound should not soften at any temperature reached by the battery in normal operation, and the temperatures permissible are limited by the softening of hard rubber, so that with the described cover that can stand a much higher temperature than hard rubber it is evident that sealing compound that remains hard at relatively high temperatures can be practically and conveniently employed. 5, is a plate structure and 6 is a soft rubber gasket interposed between it and the leaden or lead alloy cover 1.

What I claim is:

A battery container comprising the combination of a leaden cover fusible at a higher temperature than that of the softening of sealing compound and that which hard rubber can withstand, a hard rubber jar adapted to a groove in the cover, and sealing compound arranged in the groove and adapted to be softened by the application of heat to the cover in inverted position, substantially as described.

JOSEPH LESTER WOODBRIDGE.